United States Patent [19]
Mortenson

[11] Patent Number: 5,730,490
[45] Date of Patent: Mar. 24, 1998

[54] HANDLE SUPPORTED COVER FOR INFANT CAR SEAT CARRIER

[76] Inventor: Kristin M. Mortenson, 4233 Standish Ave. S., Minneapolis, Minn. 55407

[21] Appl. No.: 731,407

[22] Filed: Oct. 18, 1996

Related U.S. Application Data

[60] Provisional application No. 60/006,011, Oct. 23, 1995.

[51] Int. Cl.$^6$ .................................................. A47C 7/62
[52] U.S. Cl. ............................. 297/184.13; 297/184.11
[58] Field of Search ...................... 297/250.1, 184.1, 297/184.11, 184.13, 184.14, DIG. 6, 219.12; 5/482, 414, 416

[56] References Cited

U.S. PATENT DOCUMENTS

| | | | |
|---|---|---|---|
| 692,501 | 2/1902 | Bentley | 5/416 |
| 780,288 | 1/1905 | Hassemer et al. | 5/416 |
| 1,257,206 | 2/1918 | Fernbach | 5/416 |
| 1,339,527 | 5/1920 | Sperling et al. | 5/416 |
| 1,412,935 | 4/1922 | Greenbaum | 5/416 |
| 2,218,043 | 10/1940 | Lilleberg | 5/416 X |
| 4,666,207 | 5/1987 | Quartano | 297/219.12 X |
| 4,946,221 | 8/1990 | Livingston . | |
| 4,997,231 | 3/1991 | Smith . | |
| 5,074,616 | 12/1991 | Smith . | |
| 5,184,865 | 2/1993 | Mohtzsham et al. | 5/416 X |
| 5,309,586 | 5/1994 | Sies et al. | 297/219.12 X |
| 5,432,965 | 7/1995 | Espinoza . | |
| 5,522,639 | 6/1996 | Jaime | 297/184.13 |
| 5,549,354 | 8/1996 | Rosen | 297/184.13 |

OTHER PUBLICATIONS

The Right Start Catalog, 1995, Dec.
Babywrap–N–Bonnet Advertisement and Order Form (from the Internet) Dec. 1996.

*Primary Examiner*—Milton Nelson, Jr.
*Attorney, Agent, or Firm*—Janet Peyton Schafer

[57] ABSTRACT

A cover for an infant carrier seat that is supported by the carrier's handle and creates a protective tent-like enclosure for the seated infant. The cover allows the carrier handle to be accessible to the caregiver while the cover protects the infant. The cover is flexibly attached to the carrier's handle, the handle acts to support the cover by straps (16). The handle attachment system and elastic perimeter edging (20) adjustably attaches the cover to the infant car seat carrier enabling the cover to fit many brands of carriers. The use of breathable textile cover material (18) combined with ventilation panels (22) and windows (26 and 30) provide ventilated, water-resistant protection and visibility between the infant and the caregiver. The cover converts to a sun canopy and allows access to the infant. When rolled up for storage, the cover provides an arm cushion for comfortable elbow carrying of the carrier.

17 Claims, 9 Drawing Sheets

FIG. 13

HANDLE SUPPORTED COVER FOR INFANT CAR SEAT CARRIER

BACKGROUND

This application, filed under 35 U.S.C. §111(a), replaces the provisional application, serial no. 60/006,011, filed Oct. 23, 1995 under 35 U.S.C. §111(b). Applicant claims benefit of the earlier filing date under 35 U.S.C. §120.

This invention relates to infant carriers which are portable seats with a carrying handle designed to transport small infants. Some infant carriers are also used as car seats. Specifically, this invention is a cover, supported by the handle, which serves as a weather shield and insect protector for infants seated in any type of infant car seat carrier having a handle.

Commonly, the only available protection for an infant taken outdoors in their carrier is their clothing and a blanket. Typically caregivers place a blanket over the baby's body and face to block the sun, snow, wind etc. The disadvantages of using only a blanket for protection are numerous, i.e. the blanket gets wet when exposed to rain or snow or other inclement weather; the blanket limits ventilation; the blanket prevents visual contact between the protected infant and the parent; the blanket may blow off in the wind; the child may overheat or become anxious or frightened with his or her face covered, to name a few.

There are two typical methods for carrying infant carriers, one is by gripping the center of the handle with one's hand. This is only comfortable for short distances since the carrier is held at an angle by an extended arm to prevent the carrier from bumping against one's leg while walking. The other common method of carrying a carrier is on one's elbow. The arm is slipped under the carrier handle to rest the handle's inner corner on one's inner elbow. The arm is held bent to carry the carrier. This method brings the carrier up to hip level and allows comfortable walking. The need to carry the carrier on the elbow may not have been obvious to some inventors in the past. It is similar to the way handbags are sometimes carried. The elbow carrying method requires less arm strength, allows easy walking, prevents banging of the carrier on the caretaker's legs and partially frees up both hands. Additionally, it enables use of the infant carrier for a longer period of time because as the baby gets heavier, e.g. up to 20 pounds, more arm strength is required. Enabling use of elbow carrying in this instance is a decided advantage.

There exists several inventions created to protect an infant being transported outdoors in their carrier. The most common is the canopy sunshade that is sometimes sold with the carriers. An example of this is U.S. Pat. No. 4,997,231 (Smith). The disadvantage of the sunshade is that it covers only half the carrier, presenting only partial protection for the infant from the sun and it does not allow elbow carrying.

Another infant seat cover is shown at U.S. Pat. No. 4,946,221 (Livingston), and is a "bunting" type cover. This cover has an opening for the child's head since it lays down on top of the child like a blanket. A disadvantage of this infant seat cover is that the child's face is exposed to inclement weather. Also, the infant can't play with toys since their hands are inaccessible.

U.S. Pat. No. 5,432,965 (Espinoza), teaches use of an infant covering blanket. The blanket can be used by first putting the blanket on the carrier with the handle coming through the slit, the infant placed inside and wrapped up in the blanket. Also, the blanket can be laid on top of the infant forming a tent-like environment. The disadvantages of this invention are that there are no means to elevate the cover off the infant wrapped inside. Also, there are no means to secure the covering's perimeter to the carrier permitting the cover to blow around in the wind thus exposing the infant to inclement weather. Additionally the handle slit will not seal around the handle allowing rain and insects to get inside the covered carrier. Also, when used as a tent-like covering, ventilation is prevented.

U.S. Pat. No. 5,074,616 (Smith) teaches a weather shield, the disadvantages of which are the inability to access the full width of the carrier handle to allow elbow carrying. Additionally, the fixed length of the four sides surrounding the carrier seat may not fit appropriately to the many brands of infant car seat carriers that are in general use. Also, the poor fit of the shield means it doesn't seal along the carrier's contours which may allow flying and crawling insects to get in and harm the infant. Also, the fasteners, for attachment to the infant car seat carrier, are fixed to the weather shield and may not fit all brands of infant car seat carriers. Additionally, with the weather shield in place, it is difficult to access the infant. The entire device must be completely removed from the infant car seat carrier to load and unload the baby. Also, the weather shield may blow-away or be lost when not in use because it cannot remain fixed to the infant car seat carrier.

For the foregoing reasons, there is a need for an effective weather protective cover for use with an infant carrier that may be used with a wide variety of infant car seat carriers and that allows either hand grasping or elbow carrying of such a covered infant car seat carrier.

SUMMARY

The present invention is directed to a protective cover for an infant car seat carrier that satisfies these needs for a carrier cover that provides protection for infants in their carriers from weather, insects, pets, while allowing easy access to the infant, a cover that conforms to fit a large number of infant car seat carriers and allows either elbow carrying or hand grasping of the occupied covered infant car seat carrier. Additionally, a cover that allows the adult to see the infant being carried and prevents the cover from being lost or blown away. An infant carrier cover for protecting an infant from weather, in combination with widely used infant car seat carrier with a U-shaped carrying handle having features of the present invention comprises a handle attachment system for supporting the cover whereby the cover creates a tent-like enclosure over the infant seated in the carrier, protecting the infant from weather and insects. The cover exposes the carrier handle in such a way to allow elbow carrying and hand-grasping of carrier handle. A perimeter elastomeric edging seals the cover to an infant car seat carrier. The cover has a central opening having fasteners attached to two sides of the opening for sealing the cover about the exposed carrier handle and permitting the cover to be used with a wide variety of infant car seat carriers.

A protective cover for protecting an infant from weather and insects, in combination with a widely used infant car seat carrier having a U-shaped handle, the cover comprising a generally circular-shaped cover of textile material having a handle attachment system for supporting the cover on the U-shaped handle whereby the cover creates a tent-like enclosure over the infant seated in the carrier. The cover exposes the U-shaped handle in such a way to allow elbow carrying and hand grasping of the carrier handle handle attachment system includes fastener means attached to two opposite sides of the central portion of cover for releasably attaching the cover to the carrier handle.

The cover further comprising a perimeter elastomeric edging for releasably engaging the cover to the carrier permitting the cover to be used with a wide variety of infant car seat carriers and for preventing the cover from being accidentally disengaged from the carrier.

The cover where the handle attachment system further comprises at least one strap, the ends of which are attached to the cover adjacent the central opening, for supporting the cover from the carrier handle.

The cover further comprising at least one fastening strap for releasably attaching the cover in a rolled up, storage position about the carrier handle, for providing a cushion for the arm of user permitting comfortable elbow carrying of the cover-attached infant car seat carrier.

The cover of textile material further comprises a breathable, washable fabric that may be de-installed for washing and easily reinstalled on the infant car seat carrier.

An additional embodiment of the cover has at least one panel selected from a group consisting of a screen window panel, a mesh panel, a clear window panel, a clear flap panel, and textile material flap, for attachment of the panel to the cover, for providing options for protection against the weather.

The cover further comprising fastening means for retaining the panels in a storage position and in a use position. The cover of where the textile material is fire resistant. The cover where the textile material is water resistant.

The cover having a fastening strap to attach the cover to the infant car seat carrier permitting use of the cover as a sun canopy.

It is an object of the present invention to provide a cover for protection of infants, in their carriers, from inclement weather, insects and pets. It is further an object to provide protection for an infant from precipitation with use of a cover having a water-resistant fabric when the cover is in its tent-shape form over the infant in the carrier. It is a further object to provide a cover of breathable fabric to permit ample ventilation to the infant seated inside the covered carrier. It is a further object to provide a cover having one or more selected panels for options in protection against sun, insects and inclement weather: such as a mesh panel to provide ample ventilation for the infant, a transparent panel to allow caregivers to view the infant and the infant to view the caregiver, a mesh window to allow ventilation to the infant while keeping insects at bay, a sun canopy to screen the infant from sunlight and inclement weather and a flap for closing any of the above mentioned panels. It is a further object to provide a cover that resists being blown off by firmly attaching the cover to the carrier by both a handle attachment system and a perimeter elastomeric edging. It is a further object to provide a protective covering for the infant that has room for an infant to play with toys and generally, for the infant to have access to his or her own hands providing a protective covering that is supported by a carrier and is elevated off of the infant. And it is an object of this invention to provide a protective covering that has a unique handle attachment system supporting the cover that exposes the carrier handle to allow both hand grasping in the middle of the carrier handle and adequate space at the handle corner to allow elbow carrying of the carrier while the cover is in place. And it is and object of this invention to provide an infant carrier cover of a universal design allowing this cover to be used with most brands of infant car seat carriers by providing an elastomeric perimeter to seal the cover against the carrier's contours, and fasteners to seal the central opening in the cover around the carrier handle. It is also an object of this invention to provide a quick and simple, non-permanent attachment of the cover that may be easily and completely removed, cleaned and reinstalled, which may be used with most brands of infant carriers which further provides easy access to the infant carried by the carrier. Also, a further object is to make use of the cover in its storage position on the carrier as an arm cushion permitting comfortable elbow carrying by cushioning the hard plastic of the typical carrier handle. The cover storage position allows the infant car seat handle to be rotated to fit behind the infant car seat when used in an automobile as instructed by car seat manufacturer permitting the cover to remain attached to the carrier for good weather outings while being immediately available when the weather turns bad. Another object of the invention is the conversion of the cover to a sun canopy when not in use as a total protective covering which allows loading and unloading of the infant.

BRIEF DESCRIPTION OF THE DRAWINGS

Understanding of the invention will be enhanced by referring to the accompanying drawings, in which like numbers refer to like parts in the several views and in which:

FIG. 10a is a detail of FIG. 10 illustrating attachment of the cover to the infant car seat carrier;

DETAILED DESCRIPTION OF THE CURRENTLY PREFERRED EMBODIMENTS

Understanding of the invention will be further enhanced by referring to the following illustrative but nonlimiting example.

What is described herein is a cover for protecting an infant from weather to be used in combination with a widely used style of infant car seat carrier, namely one having a U-shaped handle. This cover includes a handle attachment system for supporting the cover so that the cover creates a tent-like enclosure over the infant seated in the infant car seat carrier. The tent-like enclosure protects the infant from insects, sun, wind, rain and other forms of inclement weather. The cover has a central hole formed therein to expose the carrier handle, permitting either hand-grasping of the carrier handle or elbow carrying of the infant car seat carrier with the cover installed. Lining at least two portions of the hole are fasteners for sealing the inner edges of the cover to each other about the handle. The cover has a perimeter elastomeric edging for releasably attaching the cover to the carrier and for preventing passage of either insects, rain, and other forms of inclement weather inside the carrier. Both the perimeter elastomeric edging and the self-sealing hole, by means of hole fasteners, enable the cover to adapt to a variety of infant car seat carriers available today.

Figure 1:
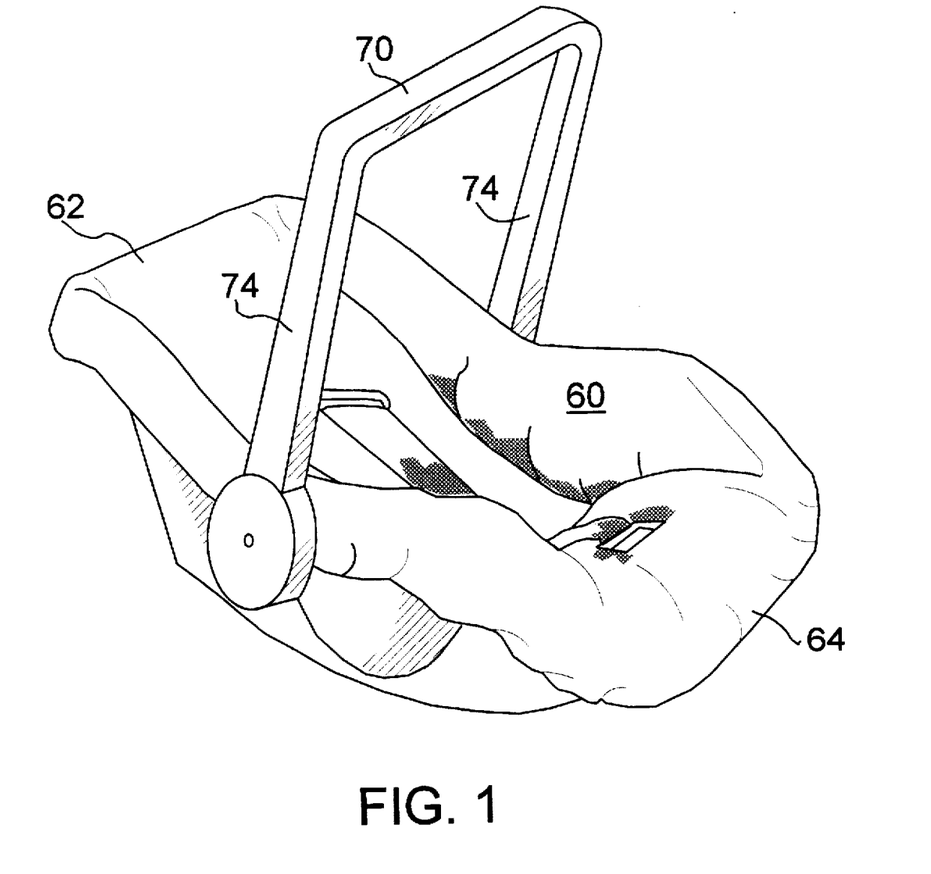
FIG. 1 is a perspective view of a typical infant car seat carrier.

Turning now to the drawings, in which like reference characters refer to corresponding elements throughout the several views, FIG. 1 illustrates a common infant car seat carrier 60 having a U-shaped handle 70, and a surface 62 on which the infant sits or reclines.

Figure 2:
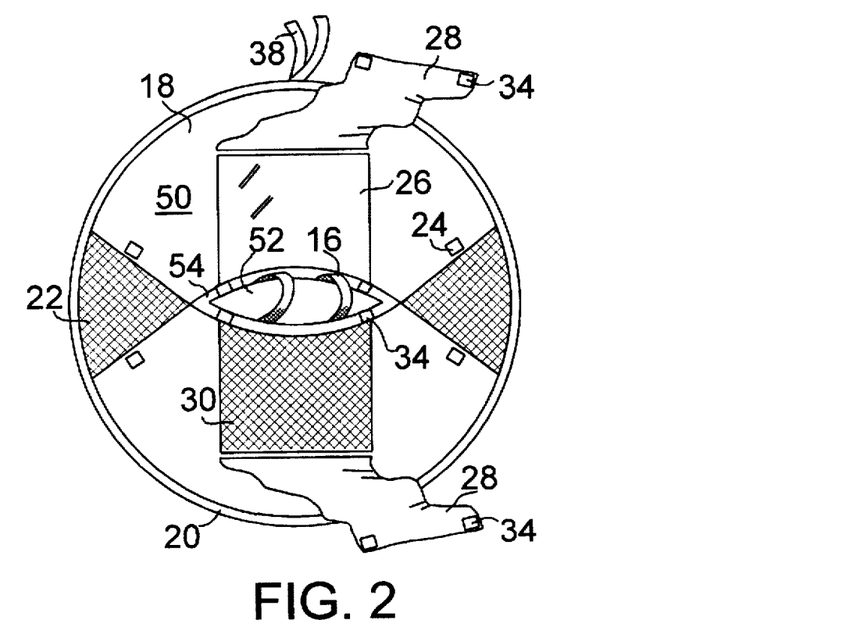
FIG. 2 is a top view of a first embodiment of the cover lying flat, with the perimeter elastomeric edging removed.

Shown generally at FIG. 2, cover 50 is generally circular shaped. In actual use conditions, rip-stop nylon has been used although any light weight, breathable, and opaque textile material, including cotton, could be used. The textile material is typically treated with a durable water repellant coating, like Zonyl® made by Ciba, Corp.

Figure 3:
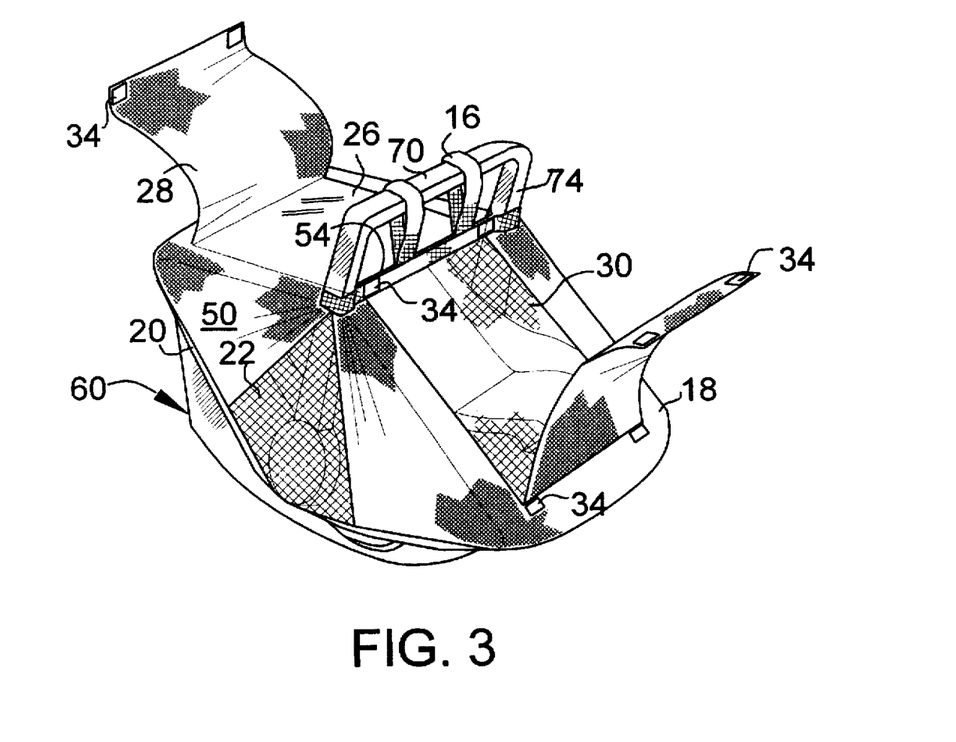
FIG. 3 is a perspective view of a first embodiment of the cover in its place of use.

Cover 50 is formed in a generally circular shape to fit onto the infant carrier 60, as shown in FIG. 3. Openings are formed in the cover 50 for a clear window 26, screen window 30 and one or more ventilation panels 22. Cover flap 28, of similar cover material, closes off clear window 26 and screen window 30 by use of panel fasteners 24 to fasten flap 28 over the adjacent opening. In actual use conditions, hook and loop style fasteners, such as Velcro®, have been used although other fasteners, such as snaps, buttons and button holes, hook, eye and loop fasteners, could be used.

Ventilation panel 22, of a size to allow adequate ventilation for and infant seated in carrier is, in actual use conditions, of nylon mesh or netting material or other material allowing ample air flow and viewing of infant. Ventilation panel 22 is attached about it's perimeter to cover 50. In actual use conditions, ventilation panel 22 is sewn to cover 50 although other attachment means, such as Velcro®, an adhesive or heat sealing, could be used. Panel fasteners 24 can be attached to either side of ventilation panel 22 at a point which allows closing off of ventilation panel 22 when cover 50 is on carrier 60, as shown in FIG. 3. In actual use conditions, panel fasteners 24 are of hook and loop style fasteners, such as Velcro®, although other fasteners, such as snaps, buttons and button holes, hook, eye and loop fasteners, could be used. Ventilation panel 22 allows ventilation for the infant under cover 50. Once cover 50 is on carrier 60, ventilation panels 22 can be oriented on either side of handle legs 74. If used, panel fasteners 24 on each side of ventilation panel 22 can be used to close ventilation panel 22 to block entrance into tent-like cover 50 of rain, wind, cold and snow.

A generally elliptical shaped hole 52 is formed across the center of cover material 18. The length of hole 52 should be adequate to allow handle 70 to come through easily, as shown in FIGS. 3,5,7,9, & 12b. Hole fasteners 54 line hole 52 between upright legs 74 of handle 70. In actual use conditions, hook and loop style fasteners, such as Velcro®, have been used although other fasteners, such as snaps, buttons and button holes, hook, eye and loop fasteners, could be used. When cover 50 is placed on infant carrier 60, hole fasteners 54 close up hole 52 around handle 70, as shown in FIGS. 3,5,7,9,& 12d, retaining the cover 50 on carrier 60 and sealing out moisture, wind, cold air and insects from the interior of the tent-like enclosure. Hole fasteners 54 tighten cover 50 above a seated infant for a tent-like effect.

Elastomeric edging 20, in actual use conditions a length of elastic cord, is threaded through a channel, although other means of fastening the edge of cover 50 could be used, attached to the perimeter of cover 50, provides attachment of the cover 50 to the carrier 60. As an alternative embodiment, the cover material could be turned under and sewn to create such a channel, or a wide band of elastomeric edging material, in use condition one inch band, could be sewn to the perimeter of cover 50. The only requirement is that there is a channel around the bottom edge of cover 50 to hold the elastomeric edging. Edging 20 aids in sealing out moisture, wind, cold air from the interior of the tent-like enclosure over the infant seated in the carrier. Additionally, the elastomeric properties of edging 20 allows cover 50 to fit many shapes and sizes of carriers 60, allows cover 50 to seal along the carriers 60 contours to prohibit entry of insects, and allows easy removal for loading and unloading the infant from the carrier 60 and allows easy removal of cover for washing.

Figure 7:
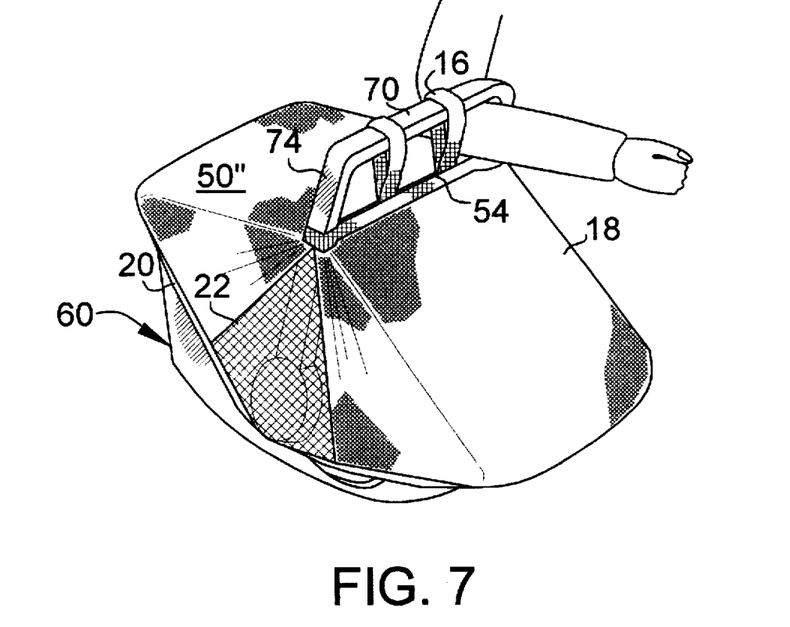
FIG. 7 is a perspective view of the third embodiment in its place of use permitting elbow carrying of the cover installed on an infant car seat carrier.

Straps 16, in actual use conditions nylon fabric, other strip material or polypropylene webbing, is attached on opposite sides of hole 52. In actual use conditions, straps 16 are sewn to cover 50, although other attachment means, such as Velcro®, adhesive or, heat sealing, could be used. The length of straps 16 determines how far down from top of handle 70 the cover 50 is suspended. Straps 16 hold cover 50 off the infant to create a tent-like effect. Length of straps 16 and spacing provide access for an adult hand to grasp the middle of handle 70 for manually carrying the carrier 60. Straps 16 are located along hole 52 such that an adult can slide their arm under handle 70 in either corner bend of handle 70 and rest handle 70 on their inner elbow allowing elbow carrying of the infant and carrier 50, as shown in FIGS. 7. Length of straps 16 also determines the clearance of the cover 50 above an infant seated in the infant carrier 60. Length of straps 16 should be short enough to maximize this clearance. One strap 16 could be used to suspend the cover 50 from the handle 10.

Figure 13:
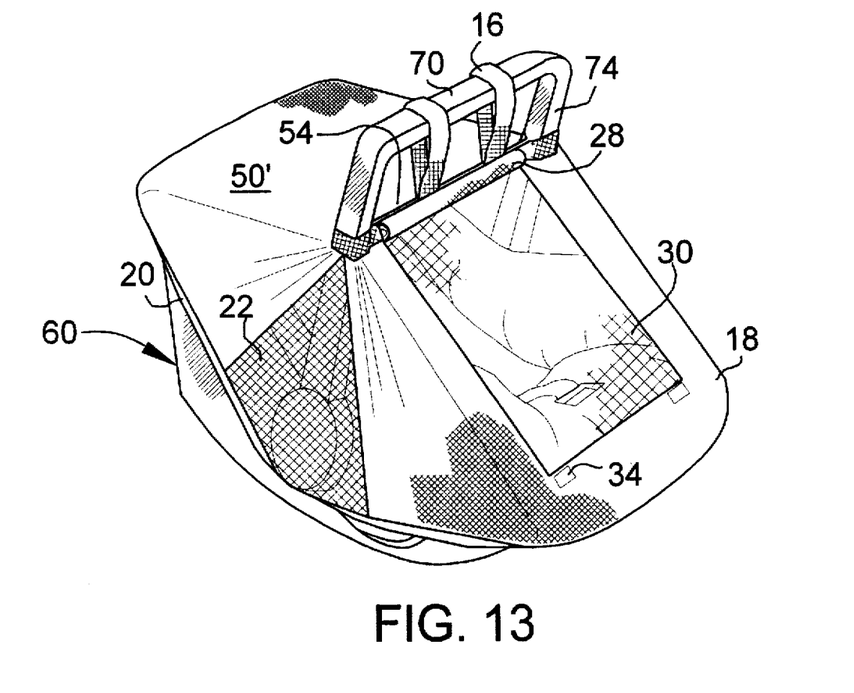
FIG. 13 is a perspective view with cover installed on infant car seat carrier with cover flap 28 rolled up in a storage position.

Panels 22 can be added to provide options for protection of the infant from weather. These panels may be a combination of clear, screen, mesh, or cover material and may be combined to make multi-layer panels for options against the weather. FIG. 13 illustrates a cover having a mesh panel along one handle-side of the cover and a screen window.

Clear window 26 is located adjacent to hole 52. Clear window 26 is, in actual use conditions, made of a clear, flexible water repellant material like clear vinyl or other materials having similar properties. Clear window 26 is attached about it's perimeter to cover 50. In actual use conditions clear window 26 is sewn to cover 50 although other attachment means, such as Velcro®, an adhesive or heat sealing, could be used. Clear window 26 is of dimensions adequate to allow viewing an infant's face when the infant is seated in carrier 60, while preventing rain, snow, wind, etc. from entering interior of tent-like cover 50.

Screen window 30 is located across from clear window 26 on the opposite side of hole 52. Screen window 30, in actual use conditions, is of nylon mesh or netting similar to the material used for ventilation panel 22. In actual use conditions, screen window 30 is sewn to cover 50 although other attachment means, such as Velcro®, an adhesive or heat sealing, could be used. Screen window 30 is of dimensions adequate to allow viewing an infant's face who is seated in carrier 60. Screen window 30 provides added ventilation while preventing insects from entering interior of tent-like cover 50.

Cover flap 28 is attached to cover 50 at the edge of clear window 26. A second cover flap 28 shutters and screen window 30. Cover flap 28 is of the same material as cover 50, namely, nylon. Cover flap 28 is large enough to shelter clear window 26 or screen window 30 completely. Cover flap 28 can be closed over screen window 30 for warmth to block rain, wind cold and snow from affecting the infant and over clear window 26 to block sunlight. Cover flap 28 has attached thereto flap fasteners 34. In actual use conditions, hook and loop style fasteners, such as Velcro®, have been used although other fasteners, such as snaps, buttons and button holes, hook, eye and loop fasteners, could be used. These flap fasteners 34 are used in pairs, one of each pair attached to cover flap 28 and the other of the pair attached to cover 50, clear window 26 or screen window 30. In actual use conditions, flap fasteners 34 are sewn to cover 50 although other attachment means, such as adhesive or heat sealing, could be used. Cover flap 28 may be secured by flap fasteners 34 in either a first position, FIG. 12d, sheltering clear window 26 or screen window 30, or in a second position, rolled up away from windows 26, 30, FIG. 13, for storage.

Figure 10:
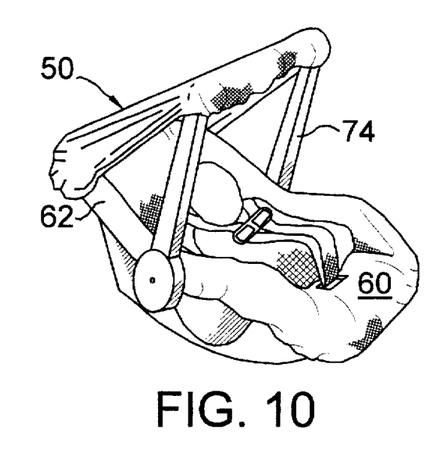
FIG. 10 is a perspective view of the cover in use as a sun canopy.
Figure 11:
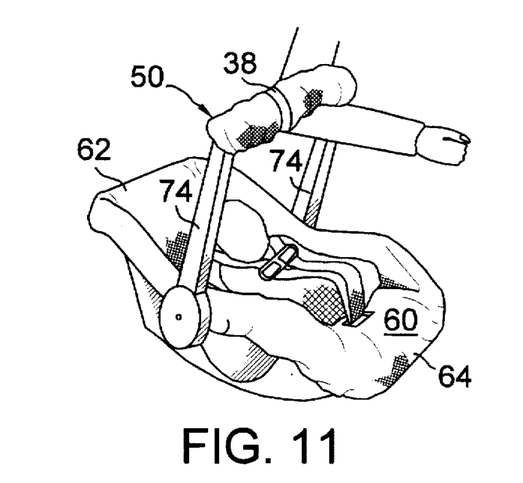
FIG. 11 is a perspective view of the cover converted to an arm cushion.
Figure 12:
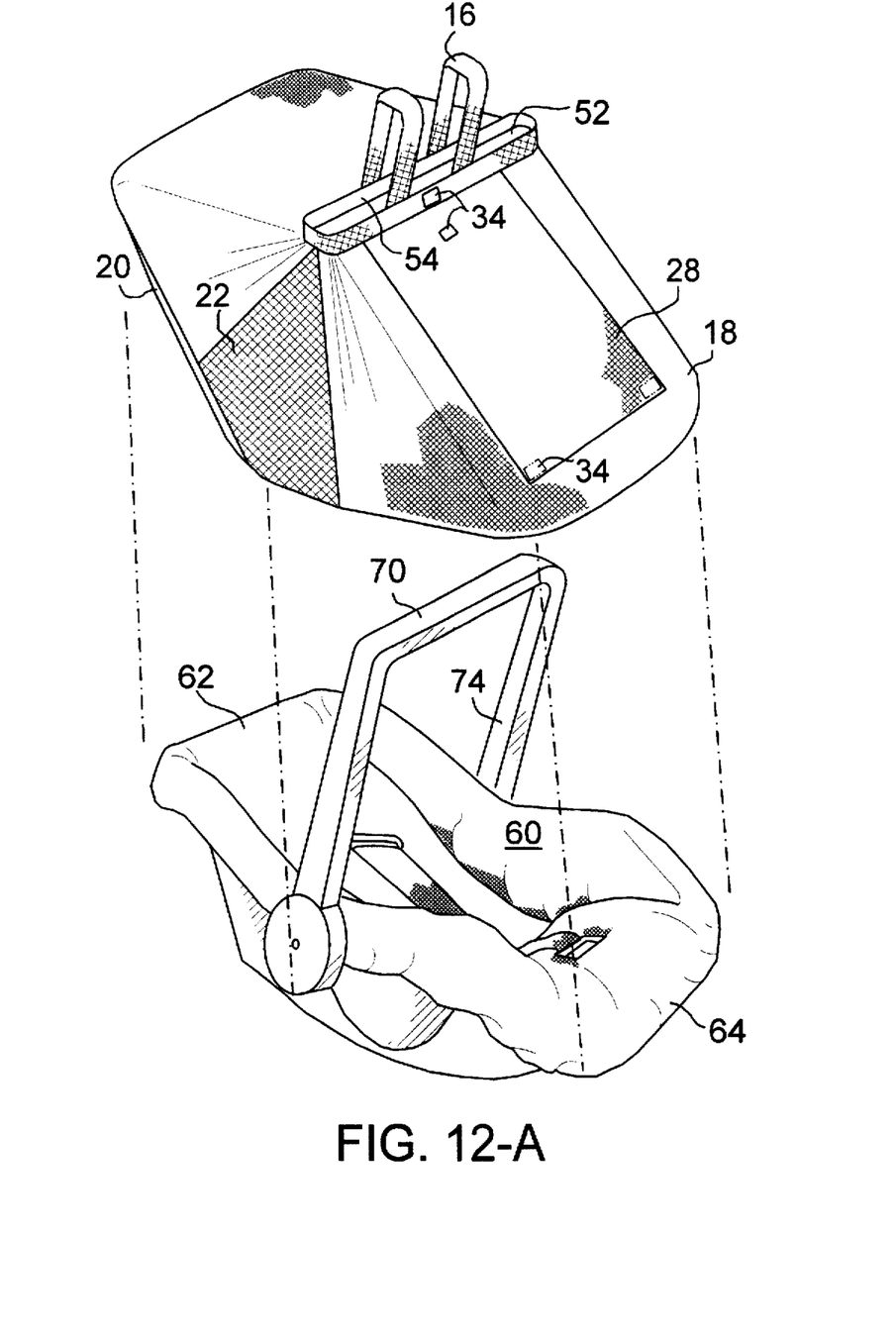
FIG. 12a is a perspective view with the cover in position above infant car seat carrier prior to installation thereon with hole 52 in an open position.
FIG. 12b is a perspective view showing the cover with handle attachment system in place on handle with hole in an open position, elastomeric edging around head of infant car seat carrier.
FIG. 12c is a perspective view with cover handle attachment system in place with hole in a open position with elastomeric edging around entire infant car seat carrier.
FIG. 12d is a perspective view with cover completely installed on infant car seat carrier, cover supported by handle attachment system.

Fastener strips 38, in actual use conditions, of Velcro® although other materials such as string, cord, nylon webbing or fabric strips, could be used, are attached to edging 20 or edge of cover 50, by sewing although other attachment means, such as an adhesive or heat sealing could be used. Fastener strips 38, in actual use conditions, are attached between edging 20 and cover 50 in a position below window 26 although they could be attached anywhere on cover 50. Fastener strips 38 are used to retain cover 50 in a storage position wrapped around handle 70 which also forms an arm cushion for the user, as shown in FIG. 11. Fastener strips 38 of textile material can be lined with hook and loop fasteners or snaps, buttons and button holes, hook, eye and loop fasteners attached to an end of each fastener strip 38, could be used. Fastener strips 38 can also be used to fasten to seat belt straps, FIG. 10a, in an automobile behind the head of the carrier to keep the infant from pulling cover 50 down upon themselves when the cover 50 is in the sun canopy mode, FIG. 10.

In use, cover 50 fits over most existing infant carriers 60 and could be adapted to most new designs. The perimeter attachment, edging 20, allows adjustment of fit on a variety of styles of carriers 60. Additionally, the central hole 52 with hole fasteners 54 allow adjustment of the fit of cover 50 to a variety of styles of carriers 60.

With handle 70 in an upright position, open hole 52 and orient cover 50 so clear window 26 is over head of carrier 60, FIG. 12a. Put edge of cover over head of carrier as hole 52 goes over handle 70, FIG. 12b. Put elastomeric edging 20 around foot of carrier 64, as shown in FIG. 12c. To complete installation, close hole fasteners 54 around handle 70, FIG. 12d. In some instances, handle 70 is narrow, so the outside edges of hole 52 are fastened outside of handle 70. Fastener straps 38 may be used to secure cover 50 to carrier 60 by fastening straps 38 around carrier strap, 40, shown at FIG. 10a, used to retain infant in carrier 60. To make a canopy, loosen manually cover 50 near foot of carrier 64 and flip this end of cover 50 over handle 70, as shown in FIG. 10. When it is desired to place handle 70 in a position other than upright, such as rotated back to a storage position when using an infant car seat carrier 60 in a vehicle not shown, put cover 50 into a rolled-up storage position, as shown in FIG. 11, prior to rotating handle 70 to its' storage position behind head of carrier.

Figure 9:
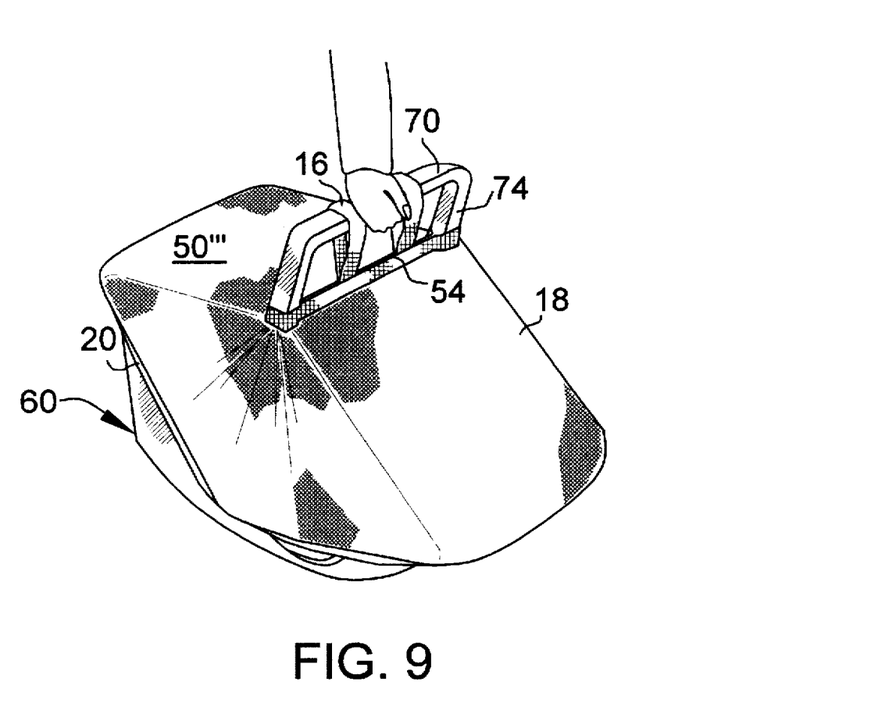
FIG. 9 is a perspective view of the fourth embodiment in its place of use permitting the user to had grasp the handle of the carrier.

Cover 50 creates a tent-like environment for an infant seated in the carrier. The cover 50 will protect the infant seated in the carrier from many elements of the weather as well as insects. The carrier handle 70 can be used for both elbow carrying, and hand carrying as shown in FIGS. 7 & 9, when the cover 50 is in place. The cover allows viewing of the infant under the cover 50 through either of clear window 26 or screen window 30, when used. Ventilation panels 22 provide ventilation as well as protection from insects for the infant under cover 50. Cover 50 converts to a sun canopy for loading and unloading the infant, FIG. 10. Cover 50 also converts to an arm cushion, FIG. 11.

Cover 50 fits over an infant carrier 60 when handle 70 is in the upright position, as shown in FIGS. 3,5,7,9,10,12, 13. Hole fasteners 54 lining hole 52 in the middle of cover 50 must be open or separated to fit around handle 70. As hole 52 is put around handle 70, the strap 16 will loop over handle 70, FIG. 12b. Edging 20 of cover 50 goes around the outer perimeter of carrier 60 to hold cover 50 in place, FIGS. 12c & d. The hole fasteners 54 are then closed to seal hole 52 in cover 50 between legs 74 of handle 78. Once in place, straps 16 form a loop around handle 70 suspending the tent-like cover 50 above infant's face and body. Once cover 50 is installed on carrier 60 as described, the infant can be easily loaded and unloaded by pulling edging 20 up near the foot 64 of carrier 60 and putting this section of cover 50 over handle 70, as shown at FIG. 10. This converts cover 50 to a sun canopy while providing full access to the infant. If the user prefers to not use cover 50 for a period of time, cover 50 can be stored by detaching edging 20 all around carrier 60, leaving hole fasteners 54 attached and rolling cover 50 up around handle 70 , as shown in FIG. 11. Fastener strips 38, shown at FIGS. 2,4,6,8, & 11, are then used to secure cover 50 around handle 70 forming an arm cushion, FIG. 11. Therefore, once installed, the cover 50 can be left on and converted as needed.

Figure 4:
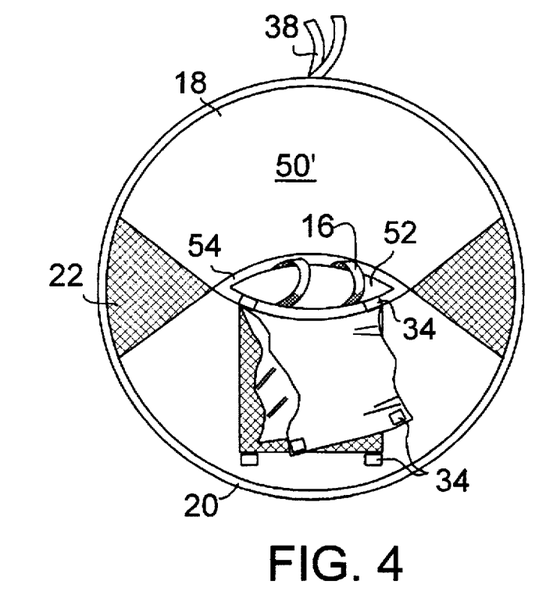
FIG. 4 is top view of a second embodiment lying flat with the perimeter elastomeric edging removed.
Figure 5:
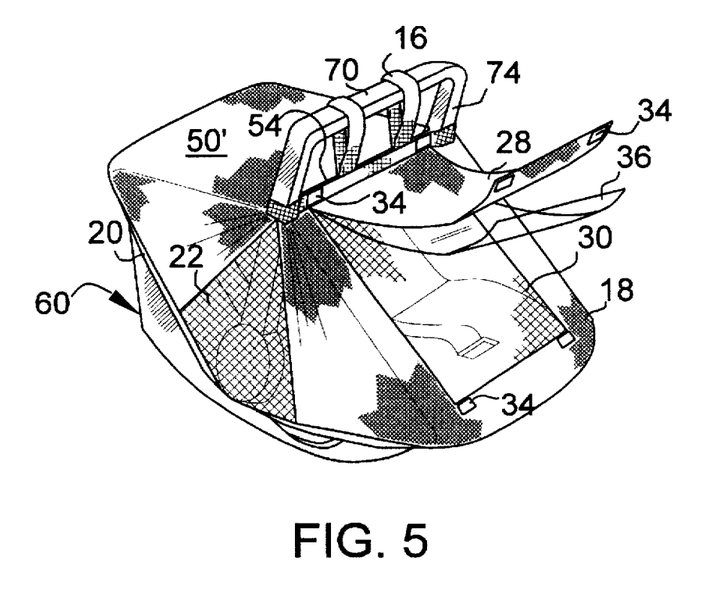
FIG. 5 is a perspective view of the second embodiment in its place of use.

FIGS. 4 & 5 illustrate a second embodiment with cover 50' having all of the features of the first embodiment except for a clear window which is replaced by a clear flap 36. Clear flap 36 is of a clear flexible water resistant material such as vinyl. Clear flap 36 is attached to cover 50 between window 30 and cover flap 28, clear flap 36 is attachable along any edge of screen window 30 and cover flap 28. In actual use conditions, clear flap 36 is sewn in place on cover 50' although other fastening means, such as use of Velcro®, adhesive or heat sealing could be used. Clear flap 36 is large enough to cover screen window 30 completely. Clear flap 36 may be lined with flap fasteners 34 to secure it in place over screen window 30 and to provide means to secure it away from screen window 30. In use, clear flap 36 provides protection from rain, wind, cold, etc. while allowing viewing of the infant seated in the carrier 60. Cover flap 28 is large enough and positioned such that it can cover clear flap 36. Cover flap 28 is lined at a lower end thereof with flap fasteners 34 to secure it in place over clear flap 36 and provide means to secure it away from clear flap 36 and screen window 30. Screen window 30 functions to allow viewing of the infant seated in the carrier and ventilation while preventing insects from entering cover 50'. Clear flap 36 is placed over screen window 30 for added warmth and to prevent rain, wind, or snow from affecting the infant. Cover flap 28 is placed over clear flap 36 and screen window 30 to prevent direct sunlight from hitting the infant under cover 50'. Cover flap 28 is shown bottom mounted in FIGS. 2 & 3, and top mounted at FIGS. 4,5 12a–d, & 13.

Figure 6:
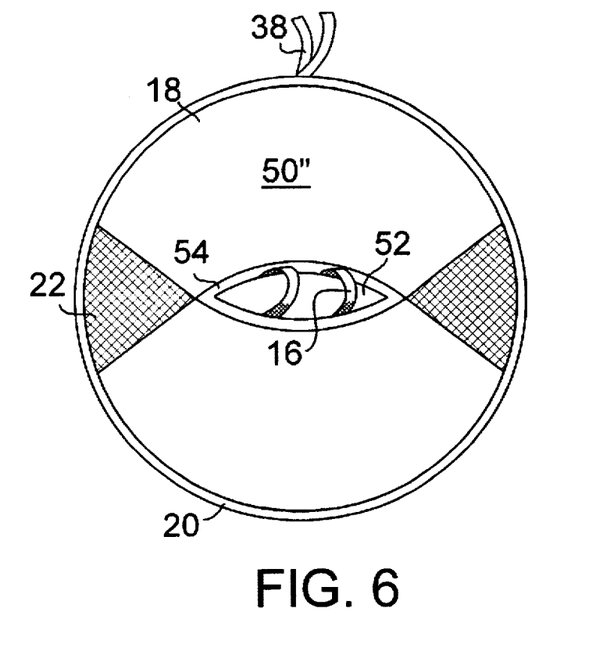
FIG. 6 is a top view of a third embodiment lying flat with the perimeter elastomeric edging removed.

A third embodiment is illustrated at FIGS. 6 & 7. In this embodiment no window openings have been formed in cover 50". Cover 50", in actual use conditions, is of breathable textile material although it could be formed of other materials such as clear vinyl. If vinyl is used, dark tinted vinyl would protect the infant from UV radiation. Ventilation panels 22 are sewn onto cover 50. If clear vinyl is used for cover 50, ventilation panels 22 alternatively could be made in cover 50 by die-cutting small holes in vinyl along cover sides, in place of ventilation panels 22.

Figure 8:
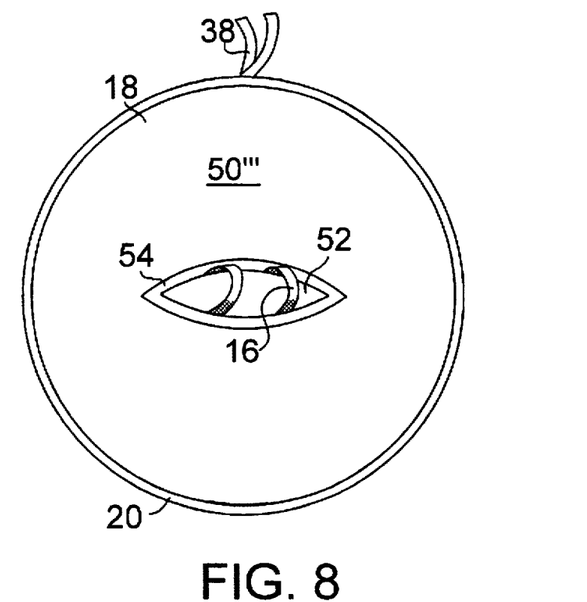
FIG. 8 is a top view of a fourth embodiment, lying flat with the perimeter elastomeric edging removed.

A fourth embodiment is shown at FIGS. 8 & 9. In this embodiment cover 50"' is formed without windows, flaps or ventilation panels. Cover 50"' could be made of breathable textile material as previous embodiments, or of a breathable and water-resistant textile material such as cotton, Goretex®, or mesh netting. This embodiment would be the least complicated to manufacture and therefore the least expensive to make since there are no windows or panels. The use of high-tech materials that allow breathability and water resistance would, however, increase the cost. If cover 50"' is made of mesh or netting, the infant is protected from insects only.

It is an object of this invention to provide a cover 50 for an infant seated in a carrier 60 protection from outdoor elements and to give the adult caregiver convenience, ease of use and peace of mind. The many advantages include protection from insects, pets, wind sun, rain, and snow while providing ample ventilation. The ability for infant and caregiver to see one another while infant is protected and the infant has room to play with toys or look at their hands inside the cover. The cover's convenience for the caregiver include the universal design to fit any carrier brand. The ability to access the carrier's handle for carrying by hand or on an elbow, thereby freeing up both hands while infant is protected is also an important advantage. The flexibility to convert the cover to a simple sun canopy or an arm cushion as needed is an important improvement. The cover can remain attached to the carrier at all times by the hole fasteners 54, in any of the converted modes so it is accessible when needed. Also, the cover is easily detachable for cleaning.

Other versions of this invention are possible. For example hole 52 could be eliminated or changed in size and shape to suit the current design of infant carriers available. Hole fasteners 54 could be any style that tend to seal the hole besides hook and loop, such as snaps, or zipper. The location and size of handle straps 16 can be adjusted to fit any current design of carrier, i.e. ergonomic handles that allow the carrier to be carried like a suitcase, with the wrist held parallel to the body. The cover material 18 could be light, dark or patterned in color to visually stimulate the infant, heavy or light in weight, water-proof or breathable to suit the weather and conditions as necessary. Also some space-age, highly reflective material could be used to reflect radiant heat from the sun, yet be breathable and water-resistant. Any of the ventilation panels 22 can be eliminated, duplicated, changed in size, made of different material or of a different shape, attached by alternate means, i.e. attached with fasteners to create another access point to the infant, made integrally in the cover material 18 by some means such as die-cutting a hole pattern, provided there is adequate ventilation for the infant inside. Panel fasteners 24 could be eliminated if only one side of the cover has a ventilation panel 22. During rain or wind that side could be put against the caregivers body blocking the rain from affecting the infant and eliminating the need for the panel fasteners 24. Also, the panel fasteners 24 size, shape or orientation could be changed. There could be two screen windows 30 for a summer version, or clear window 26 could be duplicated similarly for a winter version. The size, shape, material and color could also be altered. A larger panel would give more view of the child. A tinted material would block the sun. Cover flaps 28 could be eliminated, changed in size, material, shape or color or could be attached in a different orientation such as the top or sides of the window instead of the bottom or they could be detachable from the cover or they could be an integral cover that is made from the excess cover material 18. Screen window 30 could be eliminated, or duplicated depending on ventilation needs due to season and cover material 18 choice. The material can change and the connection to the cover could be made permanent or temporary, with fasteners, for access to the infant. Flap fasteners 34 can be eliminated or duplicated or made different sizes, shape or location. The whole cover flap 28 could be lined to completely seal the flap. Or the flap, attached on top, could rely on gravity to hold it down on the cover with no fasteners. The material could be changed to any fastener, even a magnetic fastening means could be used. Clear flaps 36 could be duplicated over multiple screen windows to create more windows with many functions. Hole fasteners 54 can provide an area for attaching accessible toys inside the enclosure for an infant's enjoyment.

Therefore, the spirit and scope of the appended claims should not be limited to the description of the preferred versions contained herein.

What is claimed is:

1. A protective cover for protecting an infant from weather and insects, for use with an infant car seat carrier of a type having a U-shaped handle, the cover comprising:

a generally circular-shaped cover of textile material having a central opening;

a handle attachment system for supporting said cover on the U-shaped handle whereby said cover creates a tented enclosure over an infant seated in the carrier, and said central opening in said cover exposes the U-shaped handle to allow elbow carrying and hand grasping of the carrier handle, wherein said handle attachment system further comprises at least one strap attached to said cover adjacent said central opening, for supporting said cover from the carrier handle; and fastener means attached to two opposite sides of said central opening for releasably sealing said cover about the carrier handle.

2. The cover of claim 1, further comprising a perimeter elastomeric edging for releasably engaging said cover to the carrier permitting said cover to be used with a wide variety of infant car seat carriers and for preventing said cover from being accidentally disengaged from the carrier.

3. The cover of claim 1, further comprising at least one fastening strap for releasably attaching said cover in a rolled up, storage position about the carrier handle, for providing a cushion for the arm of user permitting comfortable elbow carrying of said infant car seat carrier.

4. The cover of claim 3, wherein said fastening strap attaches said cover to the infant car seat carrier permitting use of said cover as a sun canopy.

5. The cover of claim 1, wherein said cover of textile material further comprises a breathable, washable fabric that may be de-installed for washing and easily reinstalled on the infant car seat carrier.

6. The cover of claim 5, wherein said textile material is water resistant.

7. The cover of claim 5, further comprising at least one panel selected from a group consisting of a screen window panel, a mesh panel, a clear window panel, a clear flap panel, and textile material flap, said panel for attachment to said cover, for providing options for protection against the weather.

8. The cover of claim 7, further comprising panel fasteners for retaining said panel in a storage position and in a use position.

9. A protective cover for protecting an infant from weather and insects, for use with an infant car seat carrier of a type having a U-shaped handle, the cover comprising:

a generally circular-shaped cover of textile material having a central opening;

a handle attachment system for supporting said cover on the U-shaped handle whereby said cover creates a tented enclosure over an infant seated in the carrier, and said central opening in said cover exposes the U-shaped handle to allow elbow carrying and hand grasping of the carrier handle, wherein said handle attachment system further comprises at least one strap attached to said cover adjacent said central opening, for supporting said cover from the carrier handle;

fastener means attached to two opposite sides of said central opening for releasably sealing said cover about the carrier handle; and a perimeter elastomeric edging for releasably engaging said cover to the carrier permitting said cover to be used with a wide variety of infant car seat carriers and for preventing said cover from being accidentally disengaged from the carrier.

10. The cover of claim 9, further comprising at least one fastening strap for releasably attaching said cover in a rolled up, storage position about the carrier handle, for providing a cushion for the arm of a user permitting comfortable elbow carrying of said infant car seat carrier.

11. The cover of claim 10, wherein said fastening strap attaches said cover to the infant car seat carrier permitting use of said cover as a sun canopy.

12. The cover of claim 10, wherein said cover of textile material further comprises a breathable, washable fabric that may be de-installed for washing and easily reinstalled on the infant car seat carrier.

13. The cover of claim 12, wherein said textile material is water resistant.

14. The cover of claim 13, further comprising at least one panel selected from a group consisting of a screen window panel, a mesh panel, a clear window panel, a clear flap panel, and textile material flap, said at least one panel for attachment to said cover, for providing options for protection against the weather.

15. The cover of claim 14, further comprising fastening means for retaining said panel in a storage position and in a use position.

16. A protective cover for protecting an infant from weather and insects, for use with an infant car seat carrier of a type having a U-shaped handle, the cover comprising;

a generally circular-shaped cover of textile material having a central opening;

a handle attachment system for supporting said cover on the U-shaped handle whereby said cover creates a tented enclosure over an infant seated in the carrier, and said central opening in said cover exposes the U-shaped handle to allow grasping and carrying of the carrier handle, wherein said handle attachment system comprises material supporting said cover from the carrier handle; and fastener means attached to said central opening for releasably sealing said cover about the carrier handle.

17. A protective cover for protecting an infant from weather and insects, for use with an infant car seat carrier of a type having a U-shaped handle, the cover comprising;

a generally circular-shaped cover of textile material having a perimeter elastomeric edging for releasably engaging said cover to the carrier permitting said cover to be used with a wide variety of infant car seat carriers and for preventing said cover from being accidentally disengaged from the carrier;

a handle attachment system for supporting said cover on the U-shaped handle whereby said cover creates a tented enclosure over an infant seated in the carrier, and said handle attachment system exposes the U-shaped handle to allow elbow carrying and hand grasping at any point on the carrier handle, wherein said handle attachment system comprises at least one strap, ends of which are attached to said cover, for supporting said cover from the carrier handle.

* * * * *